United States Patent
Shen

(10) Patent No.: US 10,093,243 B2
(45) Date of Patent: Oct. 9, 2018

(54) SUPPORTING STRUCTURE AND BIKE-CARRYING RACK INCLUDING THE SAME

(71) Applicant: KING ROOF INDUSTRIAL CO., LTD., Taichung (TW)

(72) Inventor: Shih-Chieh Shen, Taichung (TW)

(73) Assignee: KING ROOF INDUSTRIAL CO., LTD, Taichung (TW)

( * ) Notice: Subject to any disclaimer, the term of this patent is extended or adjusted under 35 U.S.C. 154(b) by 28 days.

(21) Appl. No.: 15/354,411

(22) Filed: Nov. 17, 2016

(65) Prior Publication Data

US 2018/0134229 A1 May 17, 2018

(51) Int. Cl.
*B60R 9/10* (2006.01)

(52) U.S. Cl.
CPC ........................ *B60R 9/10* (2013.01)

(58) Field of Classification Search
CPC ........................................................ B60R 9/10
USPC ........................................ 224/519, 497, 924
See application file for complete search history.

(56) References Cited

U.S. PATENT DOCUMENTS

| | | | | |
|---|---|---|---|---|
| 4,046,297 A | * | 9/1977 | Bland ........................ | B60R 9/06 224/504 |
| 4,400,129 A | * | 8/1983 | Eisenberg ............ | A61G 3/0209 224/505 |
| 5,232,133 A | * | 8/1993 | Speer ........................ | B60R 9/06 224/485 |
| 5,303,857 A | * | 4/1994 | Hewson .................... | B60R 9/06 224/282 |
| 5,373,978 A | * | 12/1994 | Buttchen ................... | B60R 9/06 224/510 |
| 5,427,286 A | * | 6/1995 | Hagerty .................... | B60R 9/00 211/18 |
| 5,529,231 A | * | 6/1996 | Burgess .................... | B60R 9/10 224/282 |
| 5,685,469 A | * | 11/1997 | Stapleton .................. | B60R 9/06 224/505 |
| 5,950,892 A | * | 9/1999 | Tsai .......................... | B60R 9/06 224/497 |

(Continued)

FOREIGN PATENT DOCUMENTS

| | | |
|---|---|---|
| TW | M361450 U | 7/2009 |
| TW | M522164 U | 5/2016 |

*Primary Examiner* — Peter Helvey
(74) *Attorney, Agent, or Firm* — Muncy, Geissler, Olds & Lowe, P.C.

(57) ABSTRACT

A supporting structure is provided for a bike-carrying rack which includes a main body. The supporting structure includes a supporting member having a pivot portion pivoted to the main body, and a position-restricting assembly. The pivot portion has an axis, and the supporting member pivotally swings about the axis to be in a carrying position or a folded position. The position-restricting assembly has two restricting members assembled on the main body, the two restricting members are located by two opposite sides of the pivot portion, and a connection direction of the two restricting members is oblique to the axis. When being in the carrying position, the supporting member abuts against the two restricting members; and when being in the folded position, the supporting member at least non-abuts against one of the two restricting members. A bike-carrying rack including the supporting structure is further provided.

5 Claims, 6 Drawing Sheets

(56) References Cited

U.S. PATENT DOCUMENTS

| | | | | |
|---|---|---|---|---|
| 6,000,594 A * | 12/1999 | Chimenti | ............... | B60R 9/06 224/488 |
| 6,286,738 B1 * | 9/2001 | Robins | ............... | B60R 9/06 224/314 |
| 6,347,731 B1 * | 2/2002 | Burger | ............... | B60R 9/00 224/402 |
| 6,547,116 B2 * | 4/2003 | Anderson | ............... | B60R 9/06 224/506 |
| 6,644,525 B1 * | 11/2003 | Allen | ............... | B60R 9/06 224/282 |
| 6,929,163 B1 * | 8/2005 | Pedrini | ............... | B60R 9/06 224/506 |
| 2005/0061842 A1 * | 3/2005 | Tsai | ............... | B60R 9/06 224/501 |
| 2005/0133555 A1 * | 6/2005 | Bove | ............... | B60R 9/06 224/324 |

* cited by examiner

SUPPORTING STRUCTURE AND BIKE-CARRYING RACK INCLUDING THE SAME

BACKGROUND OF THE INVENTION

Field of the Invention

The present invention relates to a supporting structure of a bike-carrying rack including the same.

Description of the Prior Art

In recent years, cycling has become more and more popular, and more and more people mount bike-carrying racks on their cars so that they can take the bikes to wherever they want and ride the bike to enjoy the view along the way and relax. This type of supporting structure and a bike-carrying rack is disclosed in TWM361450 and TWM522164.

However, in this type of bike-carrying rack, a supporting member which is for carrying and supporting a bike is integrally fixed in shape, and then the supporting member is fixedly screwed to a main body of the bike-carrying rack. When the bike-carrying rack is not used, it occupies a lot of space; and if a user wants to decrease a storage space, it is time-consuming to disassemble the bike-carrying rack.

The present invention has arisen to mitigate and/or obviate the afore-described disadvantages.

SUMMARY OF THE INVENTION

The major object of the present invention is to provide a supporting structure and a bike-carrying rack including the same, when in use, two restricting members support the supporting member and increase a loading stability; and out of use, the supporting member can quickly pivotally swing and be folded to decrease a volume occupied.

To achieve the above and other objects, a supporting structure is provided for being adapted to a bike-carrying rack, the bike-carrying rack includes a main body, and the supporting structure includes a supporting member and a position-restricting assembly. The supporting member is for supporting an object and has a pivot portion for being pivoted to the main body, the pivot portion has an axis, and the supporting member pivotally swings about the axis relative to the main body to be in a carrying position or a folded position. The position-restricting assembly has two restricting members assembled on the main body, as viewed along an extension direction of the axis, the two restricting members are located by two opposite sides of the pivot portion, and a connection direction of the two restricting members is oblique to the axis. When the supporting member is in the carrying position, the supporting member abuts against the two restricting members; and when the supporting member is in the folded position, the supporting member at least non-abuts against one of the two restricting members.

To achieve the above and other objects, a bike-carrying rack is further provided, including at least one of the supporting structure mentioned above. The bike-carrying rack further includes a main body, a connecting rack and a rotation mechanism. The connecting rack is connected to the main body and for being connected to and positioned on a car body. The rotation mechanism has a first rotatable body and a second rotatable body, the first rotatable body is arranged on the connecting rack, the second rotatable body is arranged on the main body, and the second rotatable body is optionally rotatably connected to the first rotatable body.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
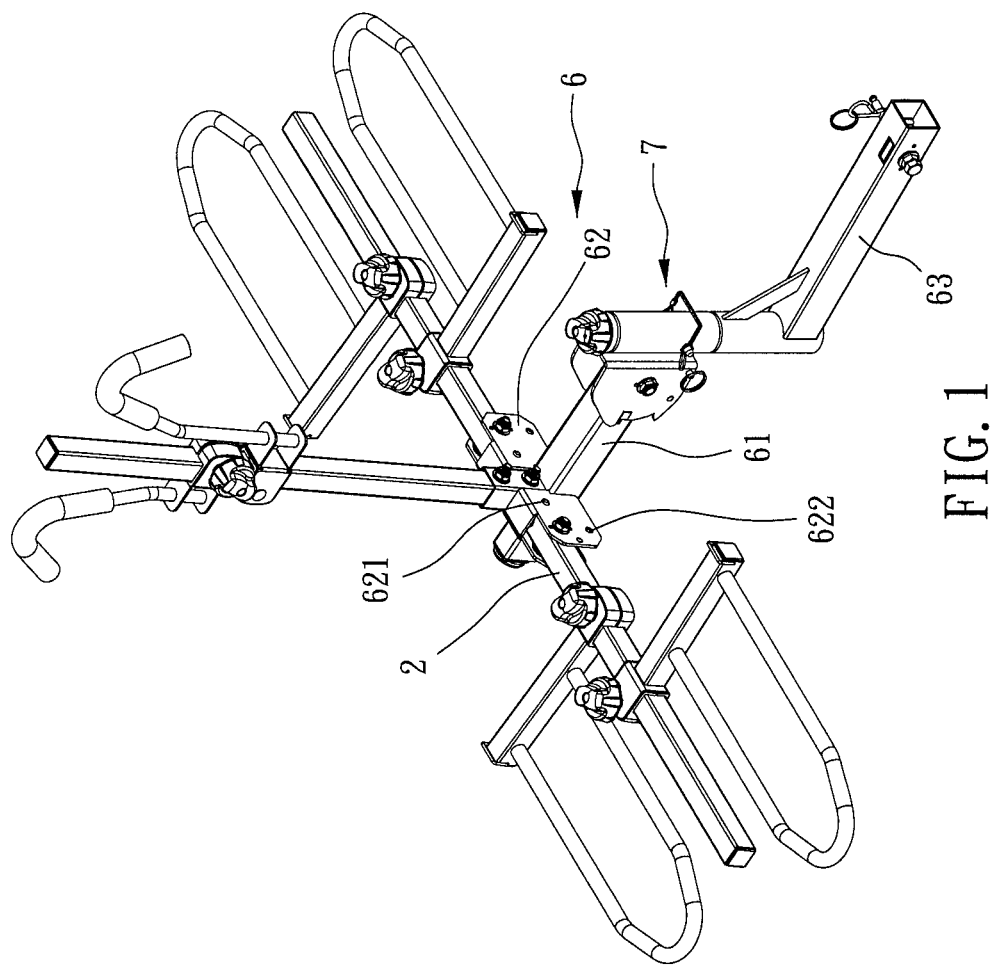
FIG. 1 is a stereogram of a preferred embodiment of the present invention.
Figure 2:
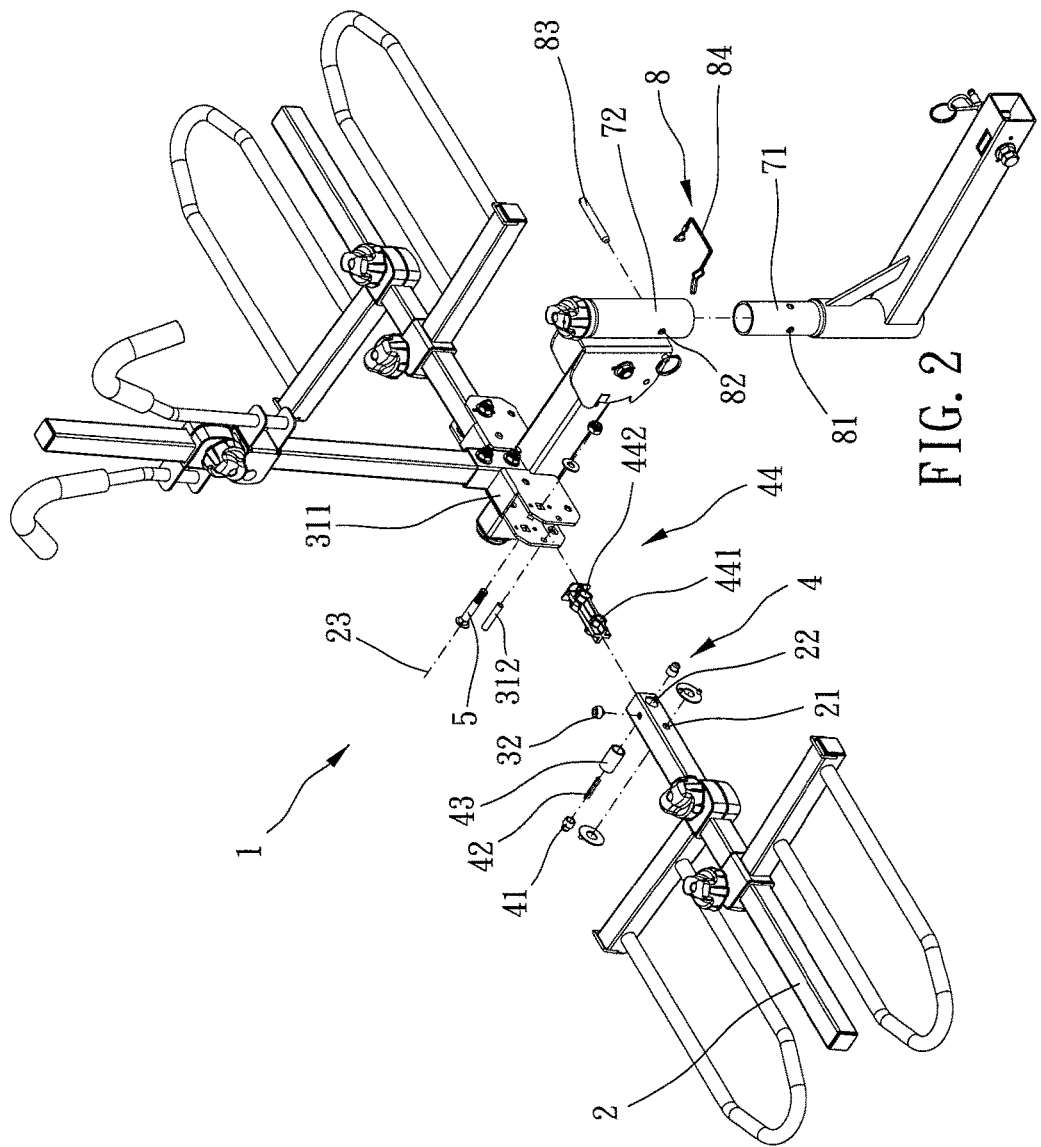
FIG. 2 is a breakdown view of FIG. 1.
Figure 3:
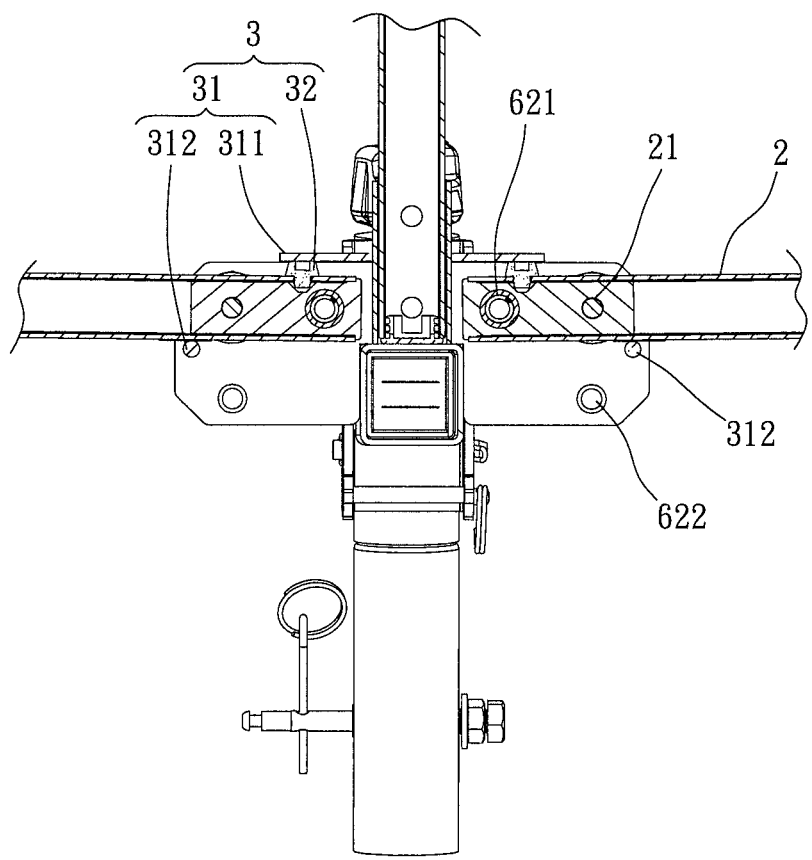
FIG. 3 is a partially cross-sectional view of FIG. 1.
Figure 4:
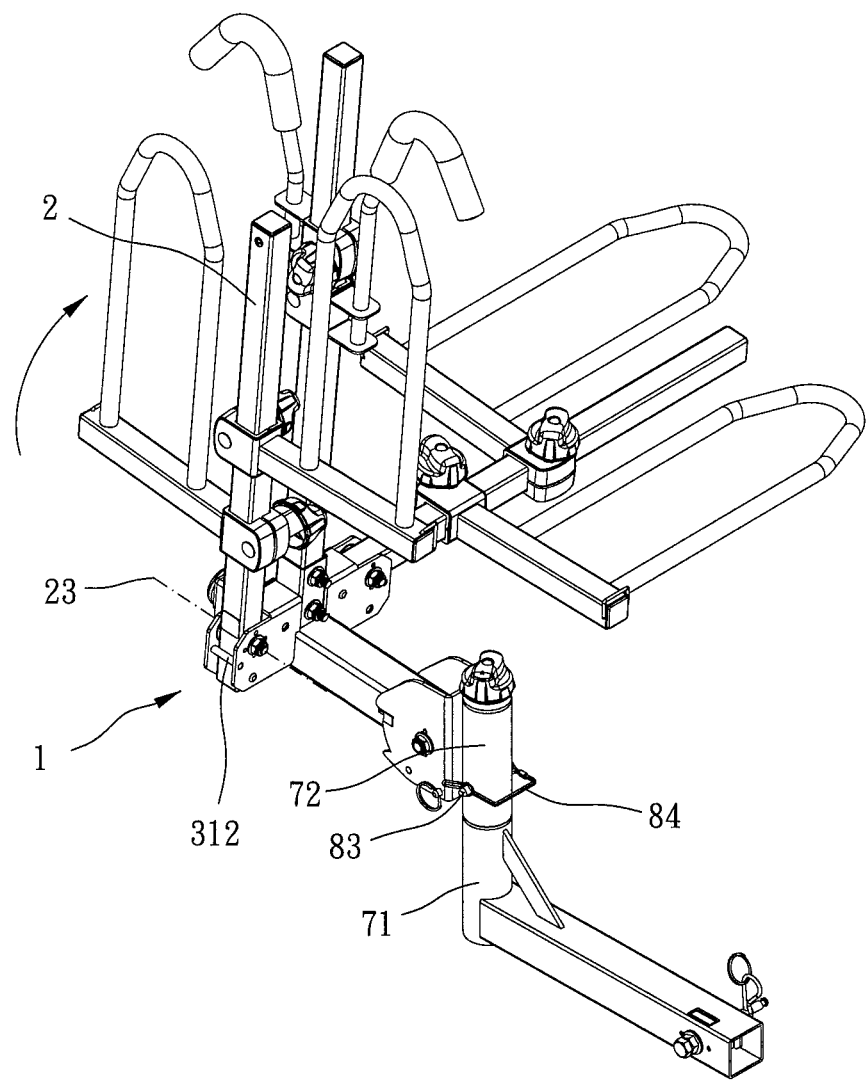
FIG. 4 is a drawing a supporting member of the present invention being folded.

The present invention will be clearer from the following description when viewed together with the accompanying drawings, which show, for purpose of illustrations only, the preferred embodiment in accordance with the present invention.

Please refer to FIGS. 1 to 6 for a preferred embodiment of the present invention. A supporting structure 1 is for being adapted to a bike-carrying rack 6, the bike-carrying rack 6 includes a main body 61, and the supporting structure 1 includes a supporting member 2 and a position-restricting assembly 3.

The supporting member 2 is for supporting an object (for example, a bike), the supporting member 2 has a pivot portion 21 for being pivoted to the main body 61, and the supporting member 2 pivotally swings about the axis 23 relative to the main body 61 to be in a carrying position or a folded position. The position-restricting assembly 3 has two restricting members 31 assembled on the main body 61, as viewed along an extension direction of the axis 23, the two restricting members 31 are located by two opposite sides of the pivot portion 21, and a connection direction of the two restricting members 31 is oblique to the axis 23. When the supporting member 2 is in the carrying position, the supporting member 2 abuts against the two restricting members 31; and when the supporting member 2 is in the folded position, the supporting member 2 at least non-abuts against one of the two restricting members 31.

In this embodiment, the main body 61 has two plate bodies 62 which are spacingly arranged, and the supporting member 2 is pivoted between the two plate bodies 62. Specifically, the two restricting members 31 are respectively defined as a first restricting member 311 and a second restricting member 312, the first restricting member 311 is board-shaped for covering the two plate bodies 62, and the second restricting member 312 is a rod body which is cylindrical for being disposed between the two plate bodies 62. When the object abuts against the supporting member 2 due to gravity, the second restricting member 312 can timely provide a upward force to the supporting member 2; in the meanwhile, the first restricting member 311 on the other side of the pivot portion 21 provides a downward force to abut against the supporting member 2 so that the supporting member 2 can stably props the object. The first and second restricting members 311, 312 respectively prop the supporting member 2 from different positions so that situation that stress concentration causing the supporting member 2 to deform can be prevented.

Preferably, the position-restricting assembly 3 further has at least one cushion member 32, and when the supporting member 2 is in the carrying position, the cushion member 32 is between the restricting member 31 and the supporting member 2. When the supporting member 2 shakes and swings due to unexpected factors (for example, a bumpy road), the cushion member 32 can prevent the supporting member 2 from impacting the restricting member 31 directly and further protect integrities of the supporting member 2 and each said restricting member 31. Each said cushion member 32 is detachably disposed on the supporting member 2, so a user can replace the cushion member 32 periodically to maintain a preferable effect.

Preferably, the supporting structure 1 further includes a positioning mechanism 4 which is disposed on the supporting member 2, and the supporting member 2 is optionally positioned in the carrying position or the folded position through the positioning mechanism 4.

More specifically, the positioning mechanism 4 has two positioning members 41 and an elastic member 42, each said positioning member 41 is connected to the supporting member 2, and the elastic member 42 is connected to the two positioning members 41 so that the two positioning members 41 have a tendency to move away from each other and are normally connected to and positioned on the main body 61. In other words, the user must press the two positioning members 41 to make the two positioning members 41 to be detached from the main body 61, and then the supporting member 2 can be moved so as to elevate a user safety.

Figure 5:
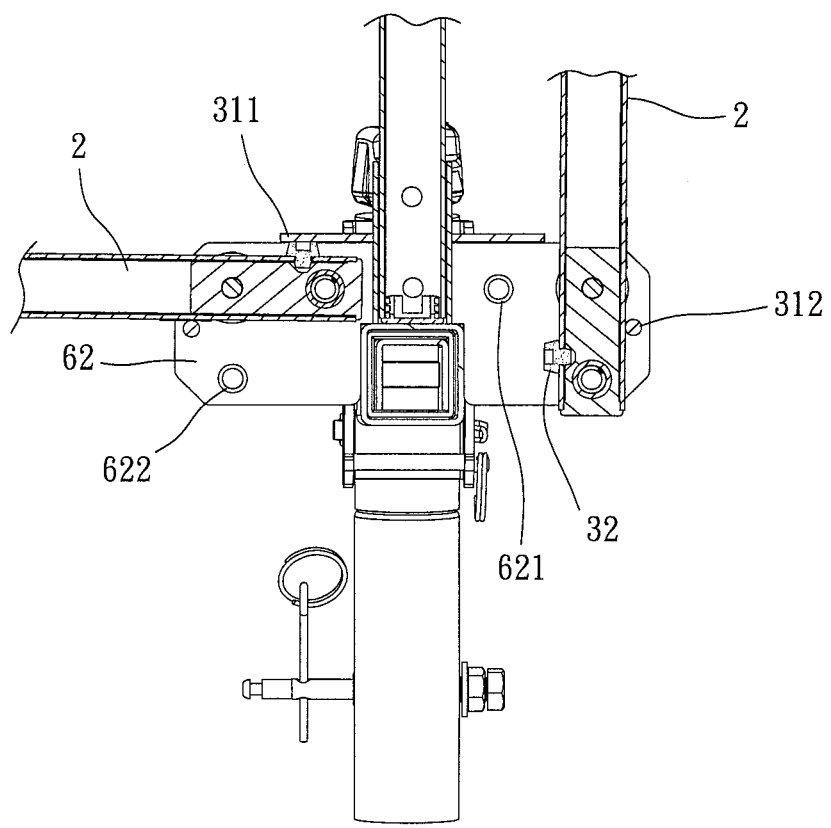
FIG. 5 is a partially cross-sectional view of FIG. 4.

More specifically, the supporting member 2 has two through holes 22, the elastic member 42 is received in the supporting member 2, and the two positioning members 41 respectively protrude out of the two through holes 22 normally. The two plate bodies 62 have two first positioning holes 621 and two second positioning holes 622 corresponding to each other, and a center of the first positioning hole 621, a center of the second positioning hole 622 and a center of the pivot portion 21 connect with each other to form an isosceles right triangle. When the supporting member 2 is in the carrying position, the two positioning members 41 respectively protrude out of the two first positioning holes 621, each said positioning member 41 abuts against the main body 61; and when the supporting member 2 is in the folded position, the two positioning members 41 respectively protrude out of the two second positioning holes 622, each said positioning member 41 abuts against the main body 61 (as shown in FIG. 5).

It is to be noted that the positioning mechanism 4 further has a base member 43, the base member 43 extends along a connection direction of the two through holes 22, and the elastic member 42 is arranged on the base body 43 and deformable along a longitudinal direction of the base member 43 so as to prevent the elastic member 42 from receiving a force and deforming improperly and from being unable to abut against the two positioning members 41 stably.

In addition, in this embodiment, the pivot portion 21 is a pivoting hole, the positioning mechanism 4 further has an assembling member 44, the assembling member 44 is inserted into and positioned within the supporting member 2, the assembling member 44 has a first assembling hole 441 and a second assembling hole 442, the first assembling hole 441 corresponds to the pivot portion 21, the second assembling hole 442 corresponds to the two through holes 22, a pivotal axle 5 is disposed through the first assembling hole 441 and the pivot portion 21 to be pivoted to the main body 61, the base member 43 is inserted into and positioned within the second assembling hole 442, the elastic member 42 is received in the base member 43, and the two positioning members 41 are respectively movably inserted in two ends of the base member 43. Each said component has a preferable structural cooperation, the components can stably actuate with each other, and it is more convenient and faster to assemble the components.

Figure 6:
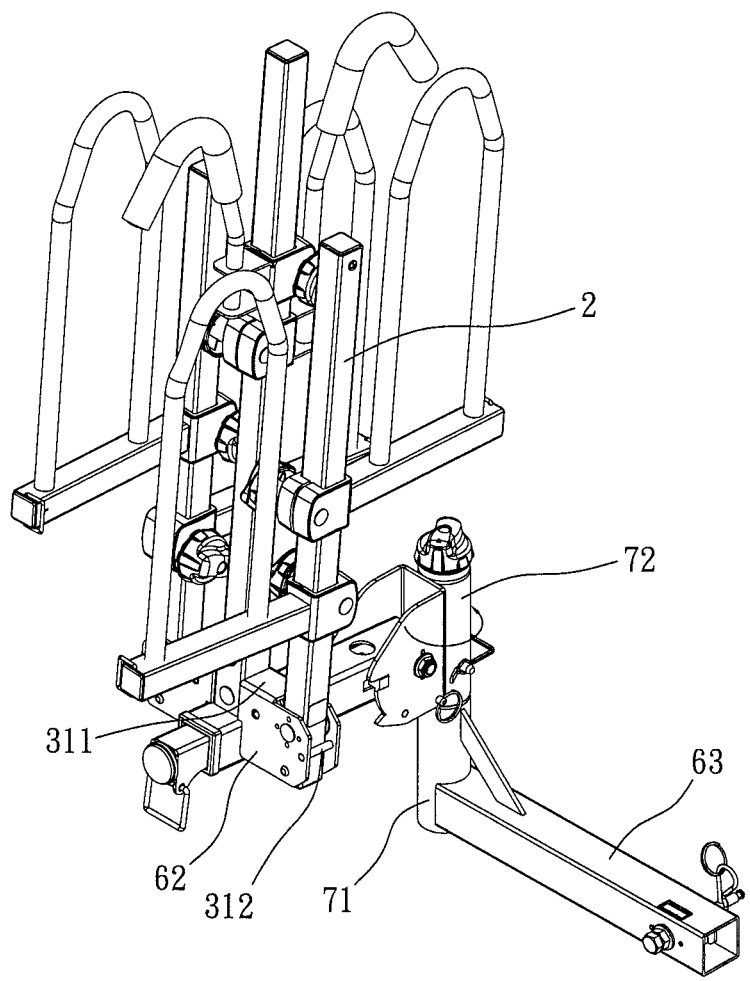
FIG. 6 is a drawing showing the present invention being folded.

The bike-carrying rack 6 is further provided, including at least one said supporting structure 1 mentioned above. The bike-carrying rack 6 further includes the main body 61, a connecting rack 63 and a rotation mechanism 7. The connecting rack 63 is connected to the main body 61 and for being connected to and positioned on a car body; the rotation mechanism 7 has a first rotatable body 71 and a second rotatable body 72, the first rotatable body 71 is arranged on the connecting rack 63, the second rotatable body 72 is arranged on the main body 61, and the second rotatable body 72 is optionally rotatably connected to the first rotatable body 71 so that when the bike-carrying rack 6 is out of use, the user can rotate the first and second rotatable bodies 71, 72 to decrease a length (as shown in FIG. 6).

In this embodiment, the first rotatable body 71 is inserted in the second rotatable body 72, the rotation mechanism 7 further has a locking mechanism 8, the locking mechanism 8 includes a pin member 83, a fixing member 84, four first locking holes 81 and two second locking holes 82, the first locking holes 81 are paired up in two sets and are disposed through the first rotatable body 71 facing each other, the two second locking holes 82 are disposed through the second rotatable body 72 facing each other and optionally correspond two of the first locking holes 81, the pin member 83 is disposed through the two second locking holes 82 and two of the first locking holes 81, and the fixing member 84 is saddled on the second rotatable body 72 to position the pin member 83.

Given the above, in the supporting structure and the bike-carrying rack including the same, the supporting member is pivotally swingable to be in the carrying position or a folded position, so the supporting structure and the bike-carrying rack including the same can be folded and put away. In addition, when the supporting member carries the object, the two restricting members can prop the supporting member effectively to make the object stably put on the supporting member. Furthermore, the positioning mechanism is provided to maintain a position of the supporting member to elevate user safety.

While we have shown and described various embodiments in accordance with the present invention, it should be clear to those skilled in the art that further embodiments may be made without departing from the scope of the present invention.

What is claimed is:

1. A supporting structure, for being adapted to a bike-carrying rack, the bike-carrying rack including a main body, the supporting structure including:
a supporting member, for supporting an object, having a pivot portion for being pivoted to the main body, the pivot portion having an axis, the supporting member pivotally swinging about the axis relative to the main body to be in a carrying position or a folded position;
a position-restricting assembly, having two restricting members assembled on the main body, as viewed along an extension direction of the axis, the two restricting members being located by two opposite sides of the pivot portion, a connection direction of the two restricting members being oblique to the axis;

wherein when the supporting member is in the carrying position, the supporting member abuts against the two restricting members; and when the supporting member is in the folded position, the supporting member at least non-abuts against one of the two restricting members;

wherein the supporting structure further includes a positioning mechanism which is disposed on the supporting member, and the supporting member is optionally positioned in the carrying position or the folded position through the positioning mechanism;

wherein the positioning mechanism has two positioning members and an elastic member, each said positioning member is connected to the supporting member, and the elastic member is connected to the two positioning members so that the two positioning members have a tendency to move away from each other and are normally connected to and positioned on the main body;

wherein the supporting member has two through holes, the elastic member is received in the supporting member, and the two positioning members respectively protrude out of the two through holes normally;

wherein the positioning mechanism further has a base member, the base member extends along a connection direction of the two through holes, and the elastic member is arranged on the base body and deformable along a longitudinal direction of the base member.

2. The supporting structure of claim 1, wherein the position-restricting assembly further has at least one cushion member, and when the supporting member is in the carrying position, the cushion member is between the restricting member and the supporting member.

3. The supporting structure of claim 1, wherein the pivot portion is a pivoting hole, the positioning mechanism further has an assembling member, the assembling member is inserted into and positioned within the supporting member, the assembling member has a first assembling hole and a second assembling hole, the first assembling hole corresponds to the pivot portion, the second assembling hole corresponds to the two through holes, a pivotal axle is disposed through the first assembling hole and the pivot portion to be pivoted to the main body, the base member is inserted into and positioned within the second assembling hole, the elastic member is received in the base member, and the two positioning members are respectively movably inserted in two ends of the base member; the main body has two plate bodies which are spacingly arranged, the supporting member is pivoted between the two plate bodies, the two plate bodies have two first positioning holes and two second positioning holes corresponding to each other, when the supporting member is in the carrying position, the two positioning members respectively protrude out of the two first positioning holes, each said positioning member abuts against the main body, and when the supporting member is in the folded position, the two positioning members respectively protrude out of the two second positioning holes, each said positioning member abuts against the main body; a center of the first positioning hole, a center of the second positioning hole and a center of the pivot portion connect with each other to form an isosceles right triangle; the two restricting members are respectively defined as a first restricting member and a second restricting member, the first restricting member is board-shaped for covering the two plate bodies, and the second restricting member is a rod body which is cylindrical for being disposed between the two plate bodies; the position-restricting assembly further has at least one cushion member, each said cushion member is detachably disposed on the supporting member, and when the supporting member is in the carrying position, the cushion member is between the restricting member and the supporting member.

4. A bike-carrying rack, including the supporting structure of claim 1, the bike-carrying rack further including:
a main body;
a connecting rack, connected to the main body and for being connected to and positioned on a car body;
a rotation mechanism, having a first rotatable body and a second rotatable body, the first rotatable body arranged on the connecting rack, the second rotatable body arranged on the main body, the second rotatable body being optionally rotatably connected to the first rotatable body.

5. The bike-carrying rack of claim 4, wherein the first rotatable body is inserted in the second rotatable body, the rotation mechanism further has a locking mechanism, the locking mechanism includes a pin member, a fixing member, four first locking holes and two second locking holes, the first locking holes are paired up in two sets and are disposed through the first rotatable body facing each other, the two second locking holes are disposed through the second rotatable body facing each other and optionally correspond two of the first locking holes, the pin member is disposed through the two second locking holes and two of the first locking holes, and the fixing member is saddled on the second rotatable body to position the pin member.

* * * * *